United States Patent [19]

Thomas

[11] Patent Number: 5,333,964
[45] Date of Patent: Aug. 2, 1994

[54] SLIP JOINT CONNECTOR

[75] Inventor: Frank P. Thomas, Huntsville, Ala.

[73] Assignee: The United States of Americas as represented by the Administrator of the National Aeronautics and Space Administration, Washington, D.C.

[21] Appl. No.: 936,474

[22] Filed: Aug. 28, 1992

[51] Int. Cl.$^5$ .............................................. F16B 7/02
[52] U.S. Cl. .................................. 403/339; 403/331; 403/381; 403/294
[58] Field of Search ............... 403/331, 339, 354, 373, 403/381, 294, 305, 287, 332-334, 340, 353, 360, 375, 217, 218, 170, 171, 176, 13, 14, 187

[56] References Cited

U.S. PATENT DOCUMENTS

| 596,490 | 1/1898 | Edwards | 403/353 |
|---|---|---|---|
| 1,435,347 | 11/1922 | Taylor | 403/353 |
| 2,962,170 | 11/1960 | Best | 403/187 X |
| 3,092,403 | 6/1963 | Gerdeman | 403/331 X |
| 4,403,885 | 9/1983 | Babb | 403/331 X |
| 4,533,122 | 8/1985 | Bannister | 256/1 X |
| 4,689,929 | 9/1987 | Wright | 403/381 X |
| 4,775,258 | 10/1988 | Lange | 403/381 X |
| 4,955,742 | 9/1990 | Marks | 403/381 X |

FOREIGN PATENT DOCUMENTS 2653835  5/1991  France ........................... 403/381

Primary Examiner—Randolph A. Reese
Assistant Examiner—Harry C. Kim
Attorney, Agent, or Firm—Robert L. Broad, Jr.; Guy Miller

[57] ABSTRACT

A slip joint connector for joining first and second structural elements together. The connector has a first body member attachable to the first structural element and a second body member attachable to the second structural element. The first body member has a male protuberance including a conical portion and the second body member has a conical receptacle for cooperatively receiving the conical portion of the protuberance. The protuberance includes a bridging portion for spacing the conical portion from the remainder of the first body member and the second body member has a well communicating with the conical receptacle for receiving the bridging portion. The conical male portion internally carries a nut while the second body member may receive a bolt through the receptacle to be threadedly received by the nut to secure the first and second body members tightly together.

5 Claims, 2 Drawing Sheets

SLIP JOINT CONNECTOR

ORIGIN OF THE INVENTION

The invention described herein was made by an employee of the United States Government and may be manufactured and used by or for the Government for Governmental purposes without the payment of any royalties thereon or therefor.

BACKGROUND OF THE INVENTION

This invention relates to a slip joint connector and more particularly to a joint that may be readily assembled and disassembled by a robot or an astronaut so that it may be used for connecting and disconnecting truss members or the like in space.

Structures, such as a truss, may be required to be assembled, fabricated or constructed by robots or astronauts in space. Such structures must therefore include readily connectible members such that the structures may be assembled or disassembled effectively with minimum effort. Structures presently envisioned include truss members having pipe ends, and it is therefore necessary to have connectible joint forming elements attachable to the pipe ends which may be readily interconnected together to form a joint between a pair of such pipe ends.

SUMMARY OF THE INVENTION

Consequently, it is a primary object of the present invention to provide a connector for easily and rapidly joining two structural members together.

It is another object of the present invention to provide a joint between a pair of structural elements, the joint comprising a male member and a female member which may be readily connected and locked together and readily disassembled so as to assemble and disassemble the structural elements in space.

It is a further object of the present invention to provide a slip joint having male and female elements, each of the elements having conically shaped mating members which may be joined and secured together readily by a robot or a human.

Accordingly, the present invention provides a slip joint connector for joining first and second structural elements together, the connector having a first body attachable to the first structural element and a second body attachable to the second structural element, the first body having a male member including a conical portion and the second body having a female member including a conical receptacle for cooperatively receiving the conical portion of the male member. The male member includes a bridging portion for spacing the conical portion from the remainder of the first body and the female member includes a well communicating with the conical receptacle, the well being configured to receive the bridging portion. When the conical portion of the male member is entirely within the female receptacle, the bridging portion of the male member is entirely within the well. When this occurs, faces of the first and second bodies remote from the respective structural elements abut. The conical portion of the male member internally carries a first locking member in the form of a nut, while a second locking member in the form of a bolt may be readily inserted through the base of the receptacle for securing the locking members together and for drawing the respective conical surfaces into a tight abutting relationship.

BRIEF DESCRIPTION OF THE DRAWINGS

The particular features and advantages of the invention as well as other objects will become apparent from the following description taken in connection with the accompanying drawings in which.

DESCRIPTION OF THE PREFERRED EMBODIMENT

Figure 1:
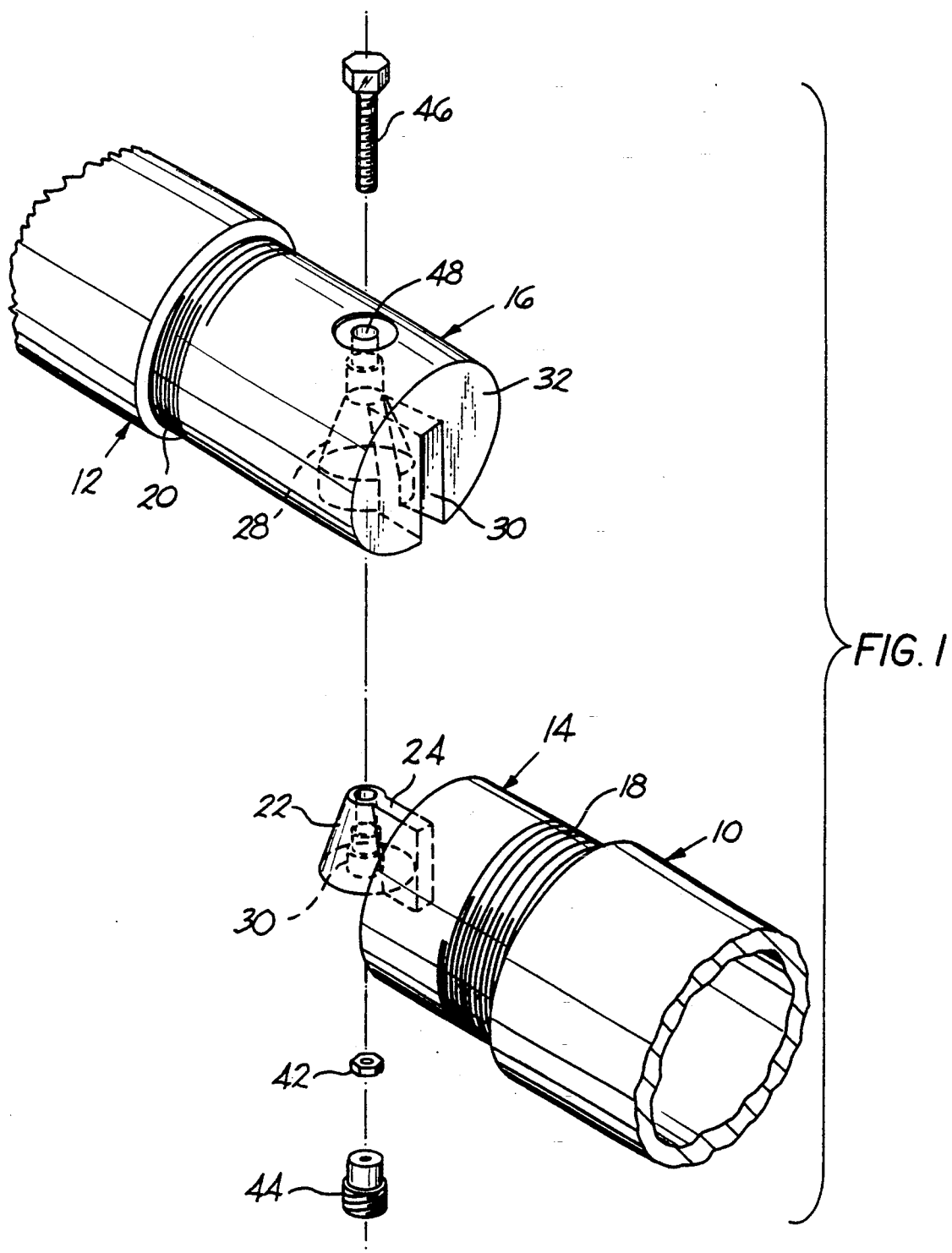
FIG. 1 is a perspective view of a disassembled slip joint connector constructed in accordance with the present invention, the connecting members being illustrated as fastened to respective structural elements which are to be joined together, and with locking elements shown exploded from the respective connector body.
Figure 2:
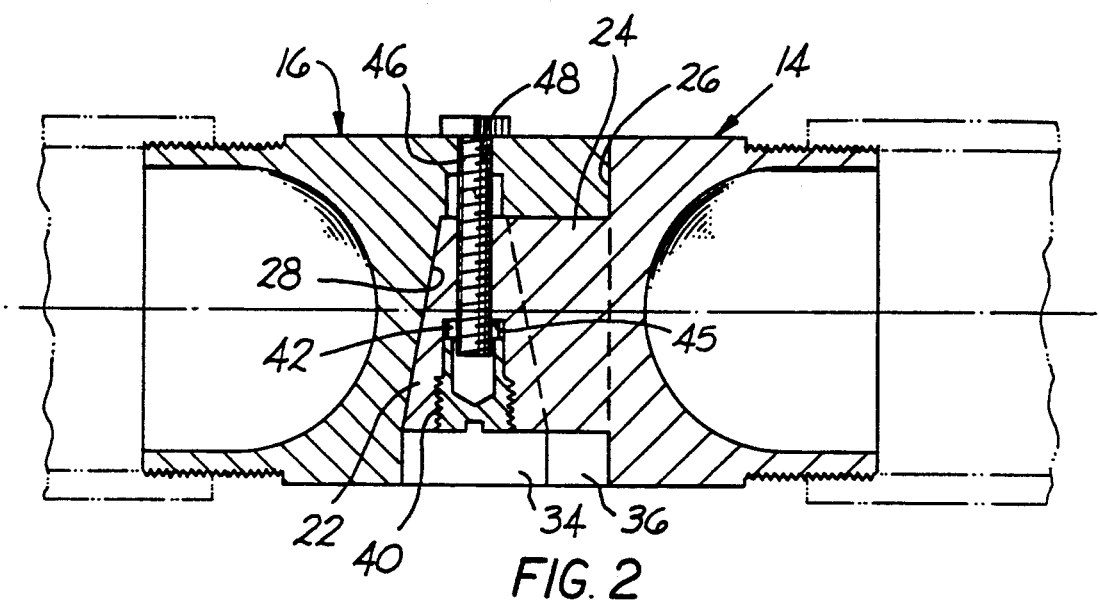
FIG. 2 is an axial cross-sectional view taken through an assembled slip joint connector of the present invention.
Figure 3:
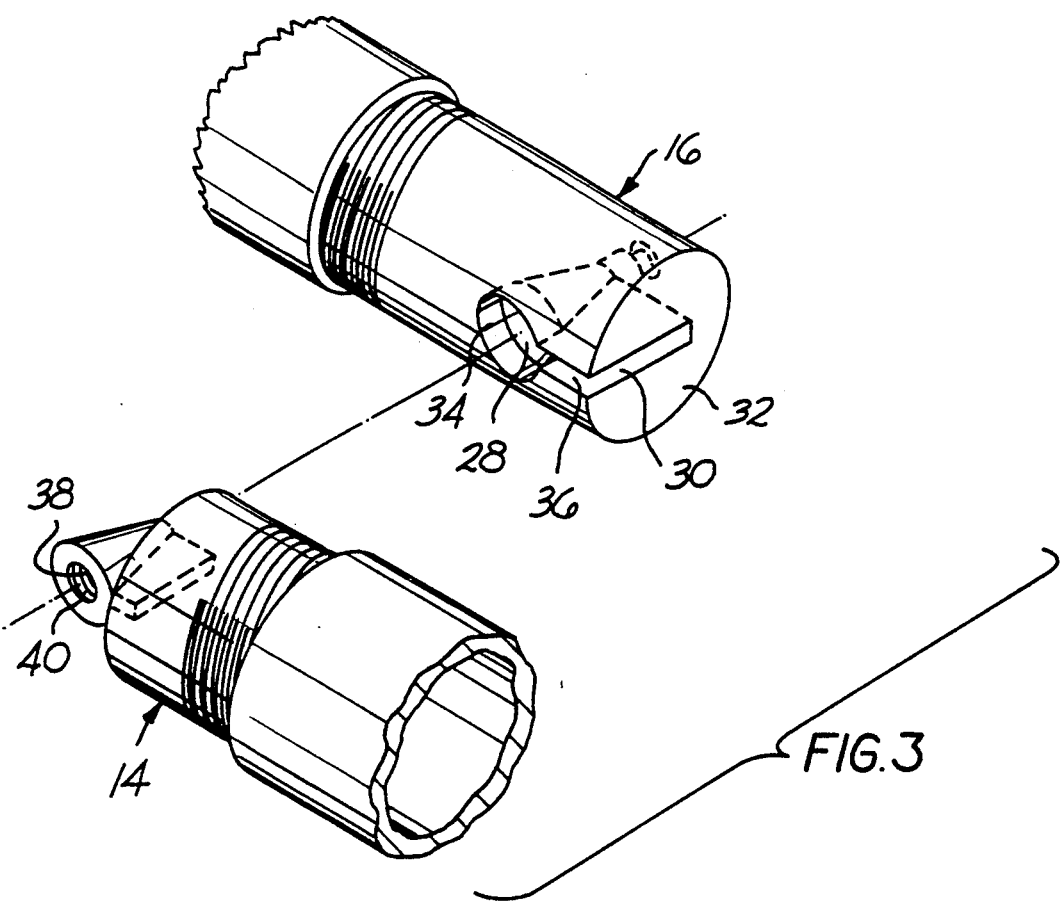
FIG. 3 is a view similar to FIG. 1, but with the members rotated 90° and with the locking elements omitted.

Referring to the drawings, FIG. 1 illustrates the ends of a pair of structural elements 10, 12 which are to be fastened together by means of a slip joint connector constructed in accordance with the principles of the present invention, the slip joint connector having a first cylindrical body member 14 shown fastened to one of the structural elements 10, and a second cylindrical body member 16 shown fastened to the other structural element 12. The structural elements, which when fastened together form a truss or the like, may have hollow internally threaded cylindrical ends and thus the first and second bodies 14, 16 are each illustrated as a cylindrical member having external threads 18, 20 at one end for cooperative attachment with the respective end of the structural element.

At the end of the first body member 14 remote from its attachment with the structural element 10 is a male protuberance 22 in the form of a truncated cone, the protuberance 22 being spaced from the body member by means of a bridge 24 integral with the protuberance and the adjacent face 26 at the end of the body member. As illustrated, the bridge preferably is of a prism form including a plurality of planar walls configured into a pair of trapezoid surfaces separated by rectangular surfaces extending between the protuberance 22 and the face 26 of the body member. The height of the bridge 24 and the conical protuberance 22 in the direction of the axis of revolution of the cone is less than the diameter of the body member 14, but preferably is greater than the radius, while in the direction normal to the axis of revolution of the cone the thickness of the bridge may be relatively small compared to the diameter of the body member 14. The diameter of the base of the cone may be less than the radius of the body member 14. These relative sizes do not appear critical and will depend to a large extent upon strength and thus material considerations.

Formed within the second body member is an internal conical recess or receptacle 28 of a size and configuration conforming to the exterior size of the conical protuberance 22 so as to form a receptacle for the member 22. Communicating with the conical receptacle 28 is another recess or well 30 which conforms to the shape of the bridge 24, the recess 30 opening at the end face 32 of the body member 16. Additionally, the conical receptacle 28 and the adjacent recess 30 communicate with recesses 34, 36 which open onto the periphery of the body member 16 adjacent to the larger diameter of the conical receptacle. The disposition of the recesses 28 and 30 within the body member 16 are such that when the protuberance 22 and the bridge 24 are disposed therein, the face 26 of the body member 14 and the face 32 of the body member 16 abut and the respective peripheries are aligned.

Formed through the conical protuberance 22 is a bore having an enlarged hollow 38 including threads 40 adjacent the larger diameter end. Positioned within the hollow 38 with its axis coaxial with the axis of the cone is a nut or other internally threaded member 42. A plug 44 having a blind bore adjacent one end and external threads adjacent the other end is threaded into the larger diameter end of the hollow 38 to abut and fixedly position the member 42 against a shoulder 45 countersunk therein. A bolt 46 is received within a bore 48 in the body member 16, the bore 48 being aligned axially with the axis of the conical recess 28 and thus with the conical axis of the protuberance 22 when the bodies are connected together. The bolt 46 is securely received within the nut member 42 and as the bolt 46 is tightened into the member 42 the conical protuberance 22 is wedged into a locked position within the recess 28 to secure the joint members together.

It should thus be clear that connection of the members together merely involves disposing the conical protuberance 22 within the conical receptacle 28. This can only occur when the bridging member 24 is received within the recess 30. Once positioned in this manner, the bolt 46 may be inserted to secure the joint members together.

Numerous alterations of the structure herein disclosed will suggest themselves to those skilled in the art. However, it is to be understood that the present disclosure relates to the preferred embodiment of the invention which is for purposes of illustration only and not to be construed as a limitation of the invention. All such modifications which do not depart from the spirit of the invention are intended to be included within the scope of the appended claims.

Having thus set forth the nature of the invention, what is claimed herein is:

1. A slip joint connector for joining first and second structural elements together, said connector having first and second body members, means for fastening said first body member to said first structural element and means for fastening said second body member to said second structural element, a protuberance projecting from said first body member in a direction remote from said first structural element, said protuberance having an external configuration including first and second portions each having a different geometric configuration, said first portion having a truncated conical configuration including an axis of elongation spaced from said first body member and said second portion having a plurality of planar walls extending intermediate said first portion and said first body member, a receptacle formed in said second body member opening onto a surface remote from said second structural element, said receptacle having internal walls of a configuration conforming in size and shape to said first and second portions for receiving said protuberance in only one disposition through said surface, and locking means for securing said protuberance within said receptacle, said locking means comprising a bore extending through said first portion of said protuberance, said bore having an enlarged cavity opening onto one end of said bore, nut means disposed within said cavity, means for securing said nut within said cavity, and bolt means extending through said second body member into said receptacle and threadedly receivable within said nut means when said protuberance is within said receptacle for drawing said protuberance tightly into abutment with said internal walls of said receptacle.

2. A slip joint connector as recited in claim 1, wherein said second portion has a pair of trapezoidal surfaces separated by a second pair of surfaces.

3. A slip joint connector as recited in claim 1, wherein each body member is cylindrical, and said means for fastening said first body member to said first structural element and said means for fastening said second body member to said second structural element each comprise threads.

4. A slip joint connector as recited in claim 3, wherein said second portion has a pair of trapezoidal surfaces separated by a second pair of surfaces.

5. A slip joint connector for joining first and second structural elements together, said connector having first and second cylindrical body members, thread means for fastening said first body member to said first structural element and thread means for fastening said second body member to said second structural element, a protuberance projecting from said first body member in a direction remote from said first structural element, said protuberance having an external configuration including first and second portions each having a different geometric configuration, said first portion having a truncated conical configuration including an axis of elongation spaced from said first body member and said second portion having a plurality of planar walls extending intermediate said first portion and said first body member, a receptacle formed in said second body member opening onto a surface remote from said second structural element, said receptacle having internal walls of a configuration conforming in size and shape to said first and second portions for receiving said protuberance in only one disposition through said surface, and locking means for securing said protuberance within said receptacle, said locking means comprising a bore extending through said first portion of said protuberance, said bore having an enlarged cavity opening onto one end of said bore, nut means disposed within said cavity, means for securing said nut within said cavity, and bolt means extending through said second body member into said receptacle and threadedly receivable within said nut means when said protuberance is within said receptacle for drawing said protuberance tightly into abutment with said internal walls of said receptacle.

* * * * *